US010984629B2

(12) United States Patent
Glenn et al.

(10) Patent No.: US 10,984,629 B2
(45) Date of Patent: Apr. 20, 2021

(54) EMOTIVE LIGHTING WITH VOLUMETRIC LIGHTING EFFECTS

(71) Applicant: SC Gaming, Inc., Las Vegas, NV (US)

(72) Inventors: Robert James Glenn, Chicago, IL (US); Timothy C. Loose, Chicago, IL (US); Nicholas Matthew Garoufalis, Pittsburgh, PA (US); Paul Michael Lesley, Chicago, IL (US)

(73) Assignee: SG Gaming, Inc., Las Vegas, NV (US)

( * ) Notice: Subject to any disclaimer, the term of this patent is extended or adjusted under 35 U.S.C. 154(b) by 152 days.

(21) Appl. No.: 15/970,972

(22) Filed: May 4, 2018

(65) Prior Publication Data

US 2018/0330568 A1 Nov. 15, 2018

Related U.S. Application Data

(60) Provisional application No. 62/504,114, filed on May 10, 2017.

(51) Int. Cl.

| | |
|---|---|
| ***A63F 13/00*** | (2014.01) |
| ***G07F 17/32*** | (2006.01) |
| ***F21V 5/04*** | (2006.01) |
| ***F21V 33/00*** | (2006.01) |
| ***H05B 45/20*** | (2020.01) |
| ***H05B 47/10*** | (2020.01) |
| ***H05B 47/155*** | (2020.01) |
| *F21Y 105/12* | (2016.01) |
| *F21W 131/40* | (2006.01) |

(52) U.S. Cl.
CPC ............ *G07F 17/3223* (2013.01); *F21V 5/04* (2013.01); *F21V 33/008* (2013.01); *G07F 17/3211* (2013.01); *H05B 45/20* (2020.01); *H05B 47/10* (2020.01); *H05B 47/155* (2020.01); *F21W 2131/40* (2013.01); *F21Y 2105/12* (2016.08); *G07F 17/329* (2013.01); *G07F 17/3293* (2013.01)

(58) Field of Classification Search
CPC ............. G07F 17/3211; G07F 17/3216; G07F 17/3209; G07F 17/3202
See application file for complete search history.

(56) References Cited

U.S. PATENT DOCUMENTS

| | | | | |
|---|---|---|---|---|
| 5,580,055 | A | 12/1996 | Hagiwara | |
| 9,257,002 | B2 | 2/2016 | Fujisawa et al. | |
| 9,292,997 | B2 | 3/2016 | Gronkowski et al. | |
| 9,311,771 | B2 | 4/2016 | Kelly | |
| 9,344,612 | B2 | 5/2016 | Ritchey et al. | |
| 2008/0132332 | A1 | 6/2008 | Pryor | |
| 2011/0111847 | A1* | 5/2011 | Lesley | H04R 5/023 463/30 |
| 2011/0263326 | A1* | 10/2011 | Gagner | G07F 17/3211 463/34 |
| 2012/0028701 | A1 | 2/2012 | Gomez et al. | |
| 2012/0108333 | A1* | 5/2012 | Radek | G07F 17/3216 463/36 |
| 2013/0316794 | A1 | 11/2013 | Pececnik | |
| 2013/0331184 | A1 | 12/2013 | Kelly et al. | |

(Continued)

*Primary Examiner* — Omkar A Deodhar
*Assistant Examiner* — Eric M Thomas

(57) ABSTRACT

An emotive lighting system creates volumetric lighting effects with a plurality of point light sources. The plurality of point light sources may be disposed on a plane and are viewable through a lenticular lens disposed a different, non-parallel plane.

20 Claims, 8 Drawing Sheets

(56) References Cited

U.S. PATENT DOCUMENTS

| | | | | |
|---|---|---|---|---|
| 2014/0295970 | A1* | 10/2014 | Gronkowski | G07F 17/3206 463/32 |
| 2015/0124065 | A1 | 5/2015 | Woods | |

* cited by examiner

EMOTIVE LIGHTING WITH VOLUMETRIC LIGHTING EFFECTS

CROSS-REFERENCE TO RELATED APPLICATIONS

This application claims the benefit of U.S. Provisional Patent Application 62/504,114, filed on 10 May 2017, which is hereby incorporated by reference in its entirety.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2017, WMS Gaming, Inc.

FIELD

Embodiments of the inventive subject matter relate generally to wagering game systems, and more particularly to wagering game systems including innovative lighting systems.

BACKGROUND

Wagering game machines, such as slot machines, video poker machines and the like, have been a cornerstone of the gaming industry for several years. In addition to the game play features provided by the wagering game machines, the audio presentation, sound effects, and visual characteristics of the game and the game machine may play a significant role in attracting and holding the attention of players in a casino or other gaming establishment. The desirable elements of such presentational aspects is a complex calculation—it goes well beyond "bigger, brighter, louder"—as a cacophony of lights and sounds may tend to overwhelm the sensibilities of the players within the confines of a wagering environment. Also, the sheer magnitude of display size and sound system wattage taxes the power capacities of the gaming machines and the utility budget of the operators. As a result, there is also a continual need and interest in systems that provide maximum visual and audio punch yet consume minimal energy.

SUMMARY OF THE INVENTION

According to one aspect of the present invention, a gaming system comprises game-logic circuitry configured to conduct a casino wagering game and an emotive lighting system including a lenticular lens defining a first plane and a plurality of point light sources defining a second plane. The first and second planes are non-parallel, and the plurality of point light sources are viewable through the lenticular lens. The gaming system further comprises one or more light-controlling processors in communication with the game-logic circuitry. The one or more light-controlling processors are configured to operate the point light sources of the plurality, responsive to communications from the game-logic circuitry, including one or more of switching point light sources on and off, varying colors of light produced by point light sources, or modifying brightness levels of point light sources.

According to another aspect of the present invention, an emotive lighting system comprises one or more light-controlling processors in communication with game-logic circuitry configured to conduct a casino wagering game. The lighting system further comprises a lenticular lens assembly including a first lens component and a second lens component. The first lens component defines a first plane and the second lens component defines a second plane that is non-parallel to the first plane. The lighting system still further comprises a first plurality of light sources that defines a third plane that is non-parallel to the first plane, and a second plurality of light sources that defines a fourth plane that is non-parallel to the second plane, and both the first and second pluralities of point light sources are viewable through both of the first and second lens components. The one or more light-controlling processors are configured to operate the point light sources of the first and second pluralities, responsive to communications from the game-logic circuitry, including one or more of switching point light sources on and off, varying colors of light produced by point light sources, or modifying brightness levels of point light sources.

In another aspect of the present invention, a method of creating volumetric lighting effects with an emotive lighting system including one or more light-controlling processors connected for communication to game-logic circuitry, a lenticular lens defining a first plane and a plurality of point light sources that are viewable through the lenticular lens and that define a second plane that is non-parallel to the first plane, comprises receiving, by the one or more light-controlling processors, information about a state of a casino wagering game being conducted by the game-logic circuitry, and operating, by the one or more light-controlling processors, the plurality of point light sources responsive to the received information. According to the method, operating the plurality of point light sources includes one or more of switching point light sources on and off, varying colors of light produced by point light sources, or modifying brightness levels of point light sources.

In yet another aspect of the present invention, a gaming machine comprises an electronic display device configured to display game images of a casino wagering game, and an emotive lighting system disposed proximal to the electronic display device. The emotive lighting system includes a plurality of point light sources extending along a line and a non-planar lenticular lens enclosing the plurality of light sources and extending along the line with the plurality of point light sources being viewable through the lenticular lens. The gaming machine further comprises one or more light-controlling processors in communication with game-logic circuitry and configured to operate the point light sources of the plurality, responsive to communication from the game-logic circuitry, including one or more of switching point light sources on and off, varying colors of light produced by point light sources, or modifying brightness levels of point light sources.

Additional aspects of the invention will be apparent to those of ordinary skill in the art in view of the detailed description of various embodiments, which is made with reference to the drawings, a brief description of which is provided below.

BRIEF DESCRIPTION OF THE FIGURES

Embodiments of the invention are illustrated in the Figures of the accompanying drawings in which.

DESCRIPTION OF THE EMBODIMENTS

General

Figure 1:
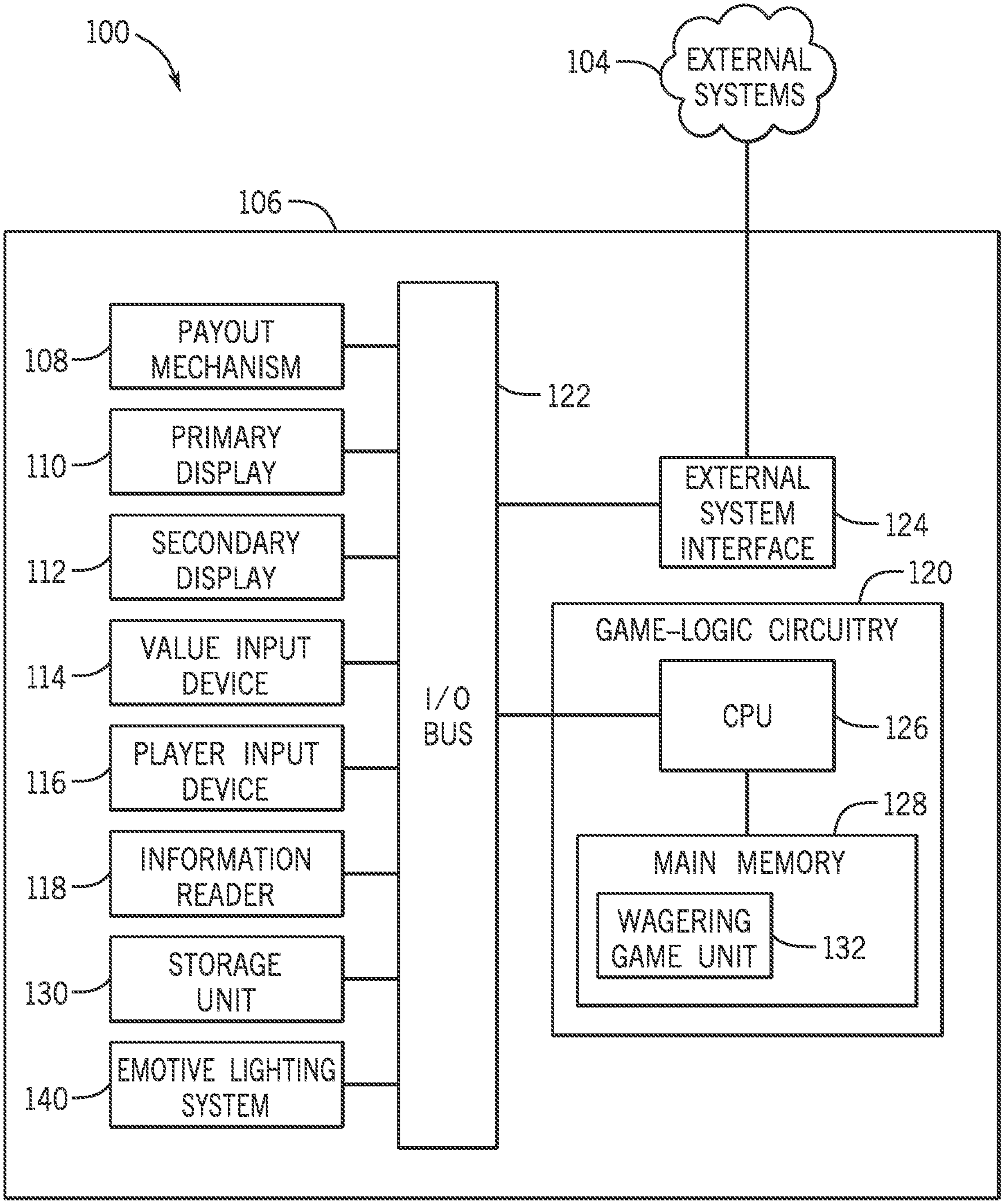
FIG. 1 is a block diagram of exemplary game machine architecture.

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Certain aspects of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims.

For purposes of the present detailed description, the singular includes the plural and vice versa (unless specifically disclaimed); the word "all" means "any and all"; the word "any" means "any and all"; and the word "including" means "including without limitation."

For purposes of the present detailed description, the terms "wagering games," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game may involve wagers of real money, as found with typical land-based or on-line casino games. In other embodiments, the wagering game may additionally, or alternatively, involve wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

For purposes of the present detailed description, the modifier "substantially" and its variants is meant to accommodate minor variations such as reasonable manufacturing tolerances, assembly tolerances, material irregularities, etc., and combinations thereof. As such, the meaning of "substantially" may vary predictably, dependent on the context of its use (e.g., "substantially flat" when referring to a machined metal part may be interpreted differently than when referring to a molded plastic part).

Overview

The embodiments described herein are exemplary emotive lighting systems configured to facilitate a "volumetric lighting effect" when implemented with various casino gaming machines, gaming systems, community game displays, and "attract" lighting.

a. Volumetric Lighting Effect

As used here and throughout, the term "volumetric lighting effect" and variations of same is used to describe the visual manifestation of point light sources viewed through a lenticular lens, and particularly the visual appearance of a plurality of point light sources substantially disposed on a particular plane and viewed through a lenticular lens substantially disposed on a different plane, or a plurality of point light sources viewed through a lenticular lens having a non-planar configuration. Under such conditions, the combination of the plurality of point light sources viewed through the lenticular lens may produce the semblance of light filling a three-dimensional volume. For example, the emotive lighting system of the current invention may produce the appearance of "tendrils of light" extending across the volume from the point light source to the lenticular lens, and extending across the lenticular lens itself. Similarly, the emotive lighting system may produce the impression of discrete "rays of light" extending from the point light sources in a plurality of directions, and the "rays" may seem to bend, diverge, converge, and intersect with rays from other point light sources. Other effects than those described here may be achieved by modifying the relative positioning of the point light sources and the lenticular lens, by modifying the physical/optical characteristics of the lenticular lens, by altering light characteristics such as color and brightness, and by various other changes and combinations thereof. Such variations are considered to be within the scope of the subject matter disclosed herein.

Gaming systems are often designed to include eye-catching lighting effects intended to attract attention even in the visually saturated interior of a casino. Bigger screens, abundant lighting with brighter luminosity and rapidly changing patterns and colors impose a "more is better" standard operating premise. Supporting larger and more complex light systems can strain the capacities of gaming machines that are already burdened with executing wagering game code along with associated audio and video presentations. The "volumetric lighting effect," in general, can enhance and expand the lighting effects of relatively few point light sources so that the light produced seems to fill an unusually large volume of space with distinctive and interesting patterns of light while requiring minimal energy expenditure. In this way, an emotive lighting system is able to provide an engaging and exciting lighting display across a significant area while maintaining minimal energy consumption.

b. Point Light Source

Much like its meaning when used in mathematical analysis, "point light source" as used here and throughout does not necessarily denote physical size. Instead, a point light source is indicative of a light source which can be reasonably approximated for convenience as a mathematical point. In this case, the point light sources are sufficiently small relative to the distances and physical dimensions of their surroundings (e.g., distance from other sources, distance from lenticular lenses, sizes of lenses etc.)

It must also be noted that, for the purposes of this invention, the "point light source" may comprise a plurality individual sources grouped together. For example, a red, green, and blue cluster (RGB cluster) of LEDs, LCDs, OLEDs, and other light sources may be considered a single point light source.

Wagering Game Machine Architectures

FIG. 1 is a block diagram illustrating a wagering game machine architecture, according to example embodiments of the invention. As shown in FIG. 1, the wagering game machine architecture 100 includes a wagering game machine 106, which includes game-logic circuitry 120 having a central processing unit (CPU) 126 connected to main memory 128. The CPU 126 can include one or more of any suitable processor(s), such as an Intel® Pentium processor, Intel® Core 2 Duo processor, AMD Opteron™ processor, or UltraSPARC processor. The main memory 128 includes a wagering game unit 132. In one embodiment, the wagering game unit 132 can present wagering games, such as video poker, video black jack, video slots, video lottery, etc., in whole or part.

The CPU 126 is also connected to an input/output (I/O) bus 122, which can include any suitable bus technologies, such as an AGTL+ frontside bus and a PCI backside bus. The I/O bus 122 is connected to a payout mechanism 108, primary display 110, secondary display 112, bill validator device 114, player input device 116, information reader 118, and storage unit 130. The I/O bus 122 is also connected to an external system interface 124, which is connected to external systems 104 (e.g., wagering game networks). In an embodiment, an emotive lighting system 140 as described later in this specification may be connected to the I/O bus 122 to facilitate communication with the CPU 126

In one embodiment, the wagering game machine 106 can include additional peripheral devices and/or more than one of each component shown in FIG. 1. For example, in one embodiment, the wagering game machine 106 can include multiple external system interfaces 124 and/or multiple CPUs 126. In one embodiment, any of the components can be integrated or subdivided.

Any component of the architecture 100 can include hardware, firmware, and any computer-readable media including instructions for performing the operations described herein. Any of the wagering game network components (e.g., the wagering game machines) can include hardware and computer-readable media including instructions for performing operations described herein. Any combination of one or more computer-readable medium(s) may be utilized. The computer readable-medium may be a computer-readable signal medium or a computer-readable storage medium. Some examples (a non-exhaustive list) of the computer-readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

While FIG. 1 describes an example wagering game machine architecture, this section continues with a discussion wagering game networks.

Wagering Game Networks

Figure 2:
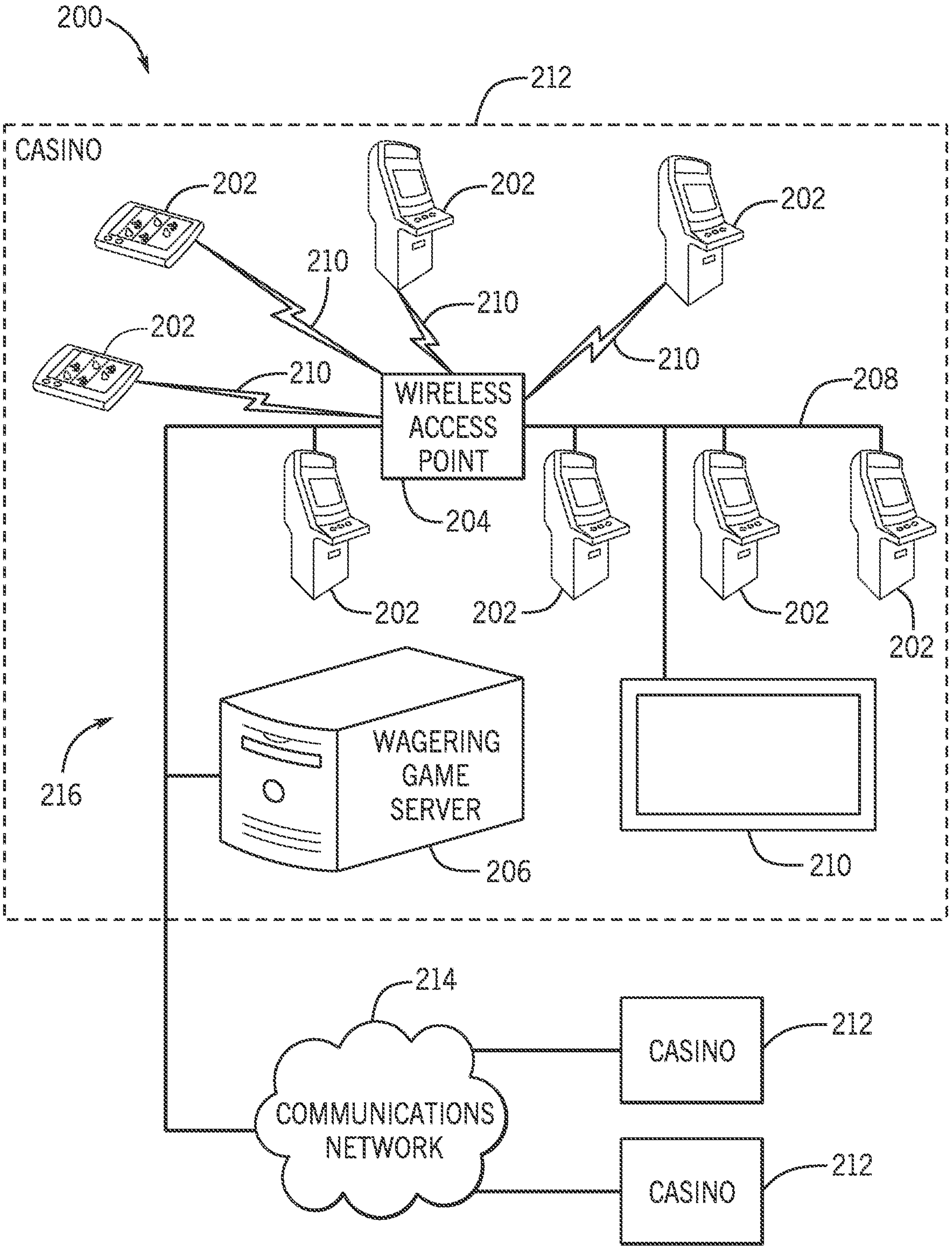
FIG. 2 is a block diagram of an embodiment of a wagering game network.

FIG. 2 is a block diagram illustrating a wagering game network 200, according to example embodiments of the invention. As shown in FIG. 2, the wagering game network 200 includes a plurality of casinos 212 connected to a communications network 214.

Each casino 212 includes a local area network 216, which may include an access point 204, a wagering game server 206, a community display device 210, and wagering game machines 202. The access point 204 provides wireless communication links 210 and wired communication links 208. The wired and wireless communication links can employ any suitable connection technology, such as Bluetooth, 802.11, Ethernet, public switched telephone networks, SONET, etc. In some embodiments, the wagering game server 206 can serve wagering games and distribute content to devices located in other casinos 212 or at other locations on the communications network 214.

The wagering game machines 202 described herein can take any suitable form, such as floor standing models, handheld mobile units, bartop models, workstation-type console models, etc. Further, the wagering game machines 202 can be primarily dedicated for use in conducting wagering games, or can include non-dedicated devices, such as mobile phones, personal digital assistants, personal computers, etc. In one embodiment, the wagering game network 200 can include other network devices, such as accounting servers, wide area progressive servers, player tracking servers, and/or other devices suitable for use in connection with embodiments of the invention.

In some embodiments, wagering game machines 202 and wagering game servers 206 work together such that a wagering game machine 202 can be operated as a thin, thick, or intermediate client. For example, one or more elements of game play may be controlled by the wagering game machine 202 (client) or the wagering game server 206 (server). Game play elements can include executable game code, lookup tables, configuration files, game outcome, audio or visual representations of the game, game assets or the like. In a thin-client example, the wagering game server 206 can perform functions such as determining game outcome or managing assets, while the wagering game machine 202 can present a graphical representation of such outcome or asset modification to the user (e.g., player). In a thick-client example, the wagering game machines 202 can determine game outcomes and communicate the outcomes to the wagering game server 206 for recording or managing a player's account.

In some embodiments, either the wagering game machines 202 (client) or the wagering game server 206 can provide functionality that is not directly related to game play. For example, account transactions and account rules may be managed centrally (e.g., by the wagering game server 206) or locally (e.g., by the wagering game machine 202). Other functionality not directly related to game play may include power management, presentation of advertising, software or firmware updates, system quality or security checks, etc.

A community display device 210 may provide special features and/or bonus games for viewing by players at multiple game machines. Community display devices 210 may operate similarly to wagering game machines 202—as thick clients and as thin clients—to present secondary and/or bonus games for community participation. Community display devices 210 may also provide non-gaming presentations such as attract features, promotional content, PSAs, etc. The community display devices 210 may operate responsive to communications from wagering game machines 202 or a gaming server 206, responsive to signals from dedicated game-logic circuitry resident in or near the community display device 210, and by combinations thereof.

Any of the wagering game network components (e.g., the wagering game machines 202) can include hardware and machine-readable media including instructions for performing the operations described herein.

Example Wagering Game Machines

Figure 3:
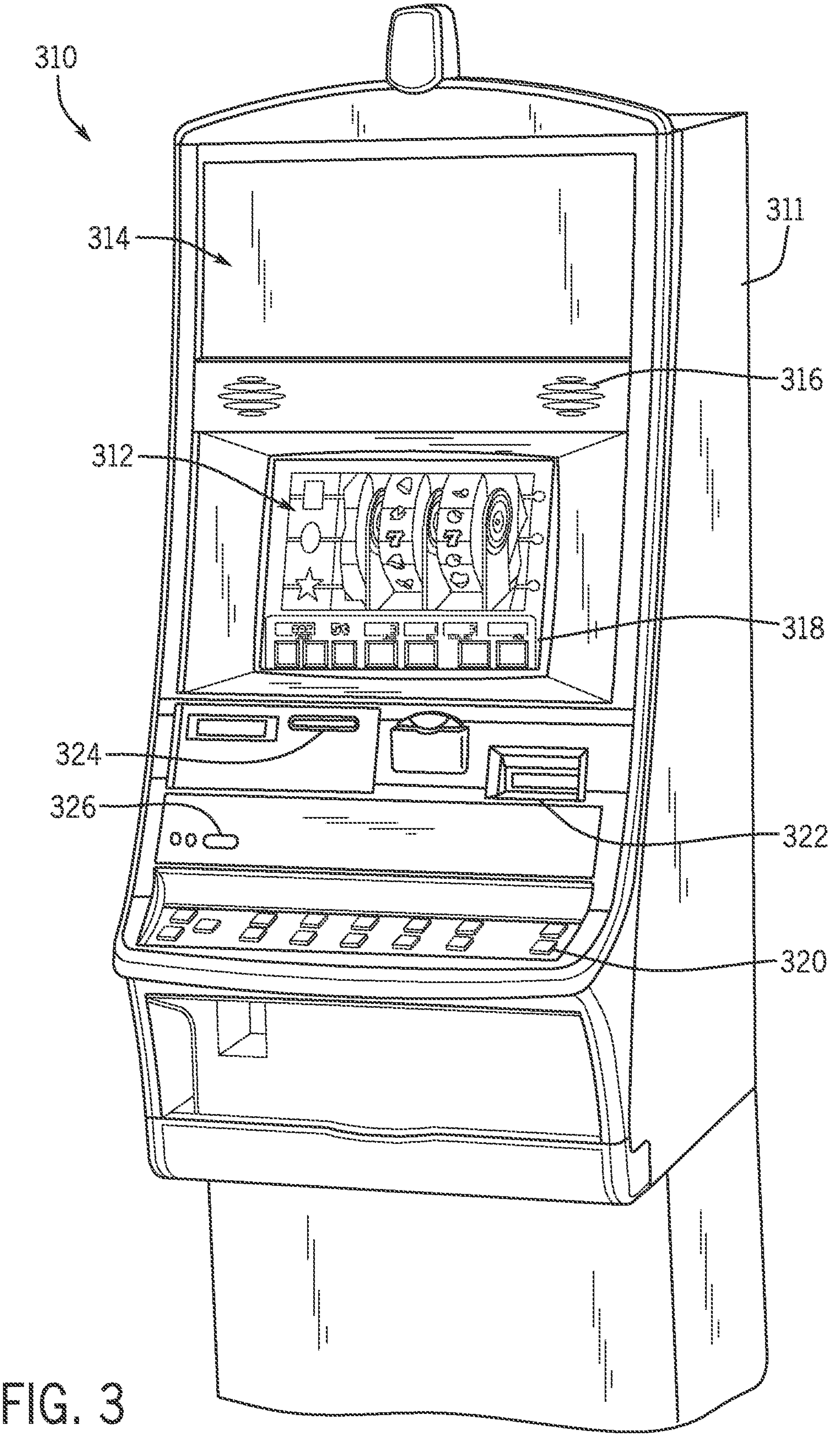
FIG. 3 is perspective view of an embodiment of a gaming machine.

FIG. 3 illustrates a gaming machine 310 similar to those used in gaming establishments, such as casinos. The gaming machine 310 may be any type of gaming machine and may have varying structures and methods of operation. The wagering game machines 202 referenced in FIG. 2 may be equivalent to a gaming machine 310. For example, in some aspects, the gaming machine 310 is an electromechanical gaming machine configured to play mechanical slots, whereas in other aspects, the gaming machine is an electronic gaming machine configured to play a video casino game, such as slots, keno, poker, blackjack, roulette, craps, etc. The gaming machine 310 may take any suitable form, such as floor-standing models as shown, handheld mobile units, bartop models, workstation-type console models, etc. Further, the gaming machine 310 may be primarily dedicated for use in conducting wagering games, or may include non-dedicated devices, such as mobile phones, personal digital assistants, personal computers, etc.

The gaming machine 310 illustrated in FIG. 3 comprises a cabinet 311 that may house various input devices, output devices, and input/output devices. By way of example, the gaming machine 310 includes a primary display area 312, a secondary display area 314, and one or more audio speakers 316. The primary display area 312 or the secondary display area 314 may be a mechanical-reel display, a video display, or a combination thereof in which a transmissive video display is disposed in front of the mechanical-reel display to portray a video image superimposed upon the mechanical-reel display. The display areas may variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 310. The gaming machine 310 includes a touch screen(s) 318 mounted over the primary or secondary areas, buttons 320 on a button panel, bill validator 322, information reader/writer(s) 324, and player-accessible port(s) 326 (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

Input devices, such as the touch screen 318, buttons 320, a mouse, a joystick, a gesture-sensing device, a voice-recognition device, and a virtual input device, accept player input(s) and transform the player input(s) to electronic data signals indicative of the player input(s), which correspond to an enabled feature for such input(s) at a time of activation (e.g., pressing a "Max Bet" button or soft key to indicate a player's desire to place a maximum wager to play the wagering game). The input(s), once transformed into electronic data signals, are output to a CPU for processing. The electronic data signals are selected from a group consisting essentially of an electrical current, an electrical voltage, an electrical charge, an optical signal, an optical element, a magnetic signal, and a magnetic element.

Community Display Device

Figure 4:
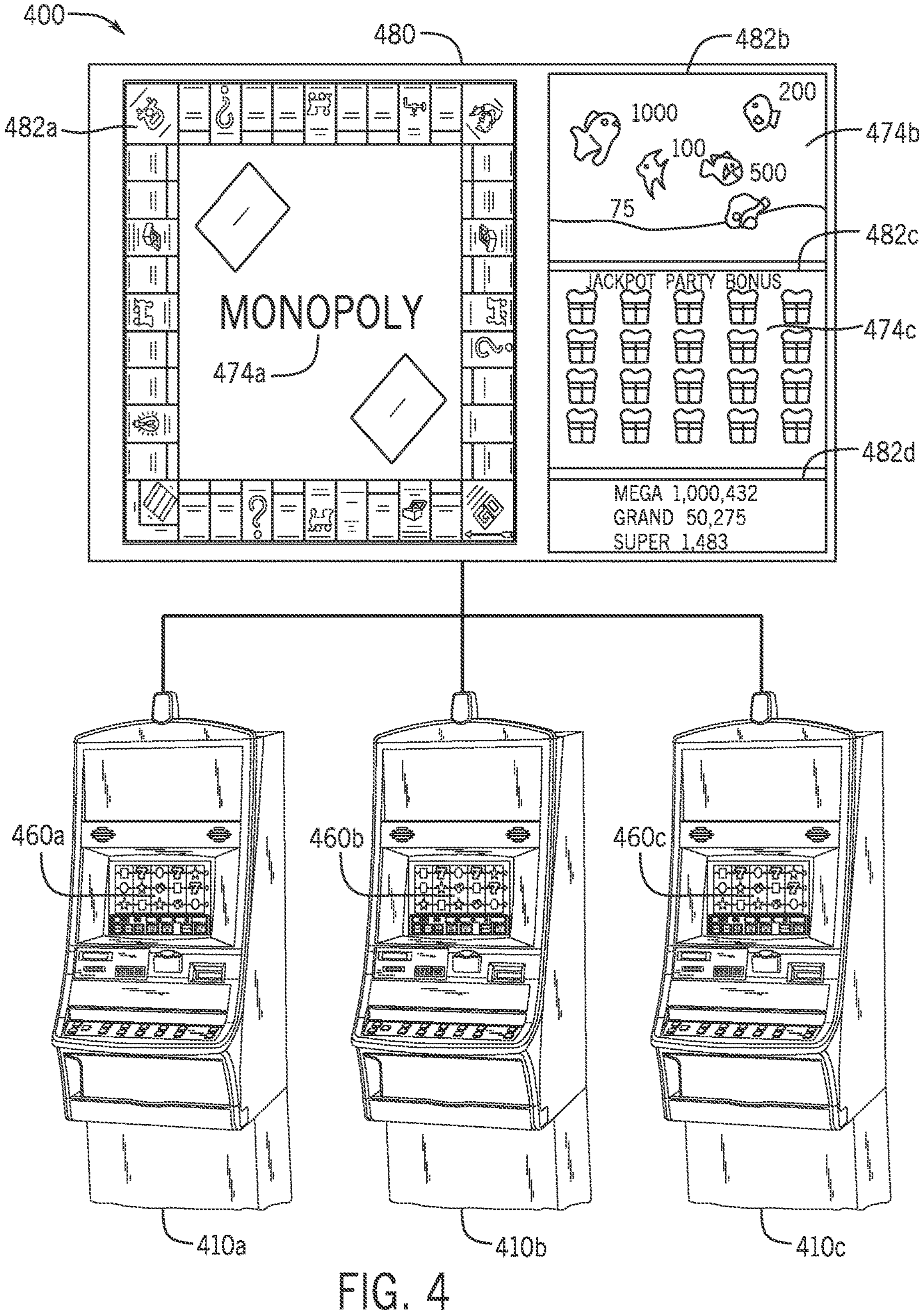
FIG. 4 is a block diagram of an embodiment of a community display and associated gaming machines.

Referring now to FIG. 4, there is shown a block diagram of an embodiment of a community display device 480 associated with a plurality of wagering game machines 410*a-c*. In some embodiments, a bank of game machines may be connected to jointly participate in a community bonus game that is displayed on the community display device. In an embodiment, a trigger event may occur during game play on one of the wagering game machines and thus trigger the community bonus game with all eligible wagering game machines participating together. The community display device 210 may be disposed proximal to the bank of game machines to enable players at the game machines of the bank to view the bonus game images on the community display device 210. The community display device 210 may comprise a single screen and may comprises multiple screens such as screens 482*a-d*.

Each wagering game machine 410*a-c* may conduct individual casino wagering games displayed on their respective display devices 460*a-c*. In response to an occurrence of the abovementioned trigger event on one of the wagering game machines 410*a-c*, one or more bonus games such as the Monopoly® game 474*a*, the fishing game 474*b*, and the Jackpot Party Bonus game 474*c* may initiate and be displayed on the community display device 480.

Emotive Lighting System Operation

Figure 5:
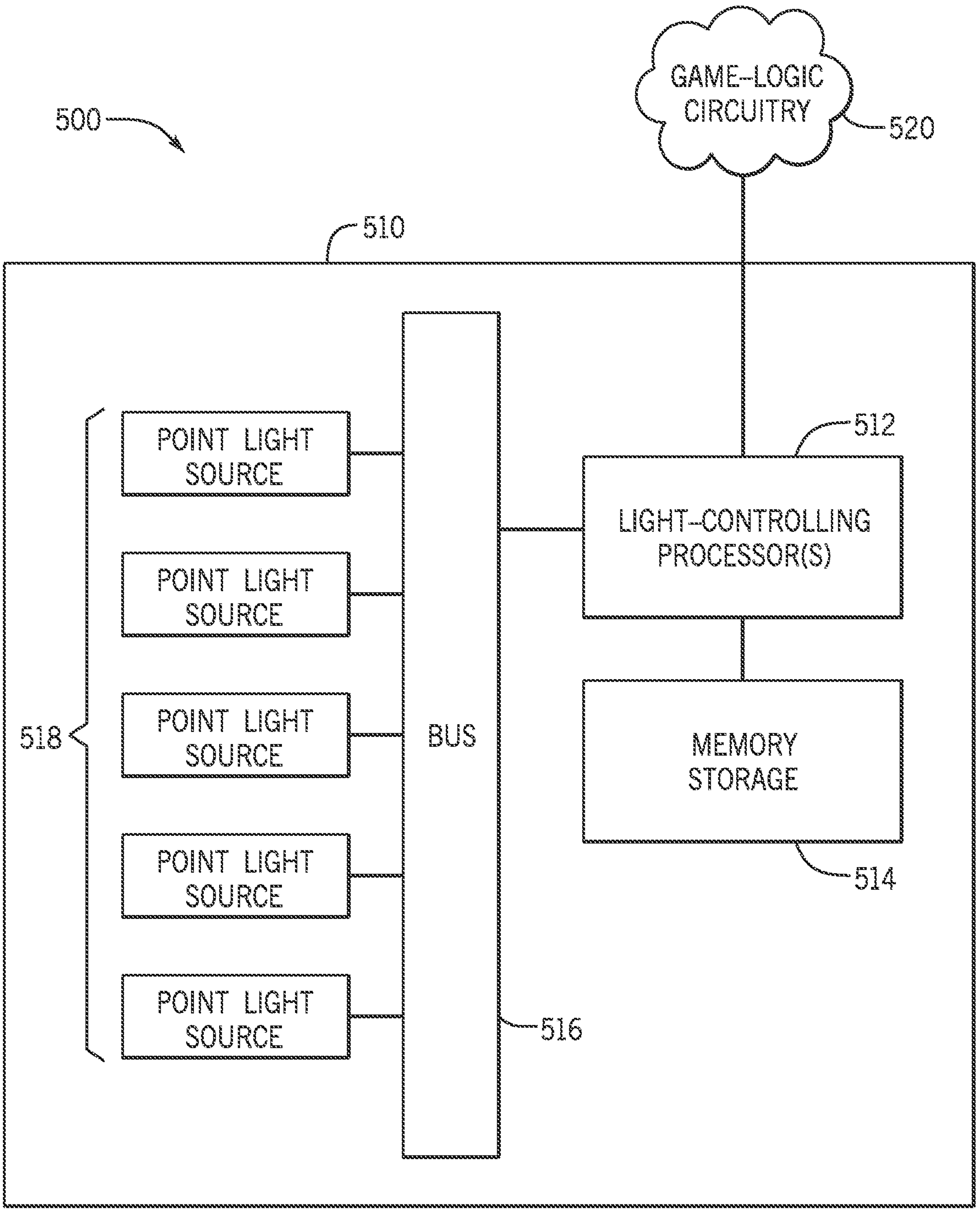
FIG. 5 is a block diagram of exemplary emotive lighting system architecture.

Referring now to FIG. 5, there is shown a block diagram of exemplary emotive lighting system architecture 500. The emotive lighting system architecture 500 includes the emotive lighting system 510. The system comprises one or more light-controlling processors 512 that operate a plurality of point light sources 518. The light-controlling processor(s) 512 are connected to a signal bus 516, which can include any suitable bus technologies, such as those identified with the I/O bus 122 of FIG. 1, and therethrough connect with the plurality of point light sources 512. In an embodiment, the light-controlling processor(s) 512 may be connected to a memory storage device 514 that stores data and/or executable instructions associated with operation of the plurality of point light sources 518. In one embodiment, the light-controlling processor(s) 512 may selectively execute stored executable instructions that cause the plurality of point light sources 518 to generate patterns and colors intended to elicit a desirable reaction from an observer.

The emotive lighting system 500 is connected for communication to game-logic circuitry 520. This connection may be implemented with various wired and wireless technologies including, but not limited to, USB, Ethernet, and DMX. In an embodiment, an emotive lighting system may be dynamically cued by signals received from the game-logic circuitry indicating various dynamic and static states of the casino wagering game being conducted by the game-logic circuitry. For example, when the casino wagering game transitions from a base game to a bonus game, the game-logic circuitry may alert the light-controlling processor(s) to the impending transition, the in-process transition, and/or the recent occurrence of the transition. In response, the light-controlling processor(s) 512 may adjust light characteristics of the point light sources in synchronization with events of the casino wagering game. "Synchronize" and its variants, as used here and throughout, is meant to include changing light characteristics simultaneously with game events, in advance of game events, and immediately following game events. In these and other ways, the lighting effects of the emotive lighting system can predict, emphasize, and enhance game events occurring in the casino wagering game in ways that heighten a player's experience of the casino wagering game.

In one example, a wagering game may present an award "bang up" sequence in which awards are tallied while accompanying music, sound effects and visual images of gold coins spilling across a primary display device are presented. During the bang up, an associated emotive lighting system can flash pluralities of point light sources in cascading patterns of gold to signify and imitate the gold coins. The lights may pulsate in rhythm with the musical accompaniment and flash in sync with the sound effects.

In producing these and other effects, the light-controlling processor(s) 512 may be responsive solely to signals from the game-logic circuitry 520 and may execute stored instructions retrieved from a memory device 514 or from a remote server.

Figure 6:
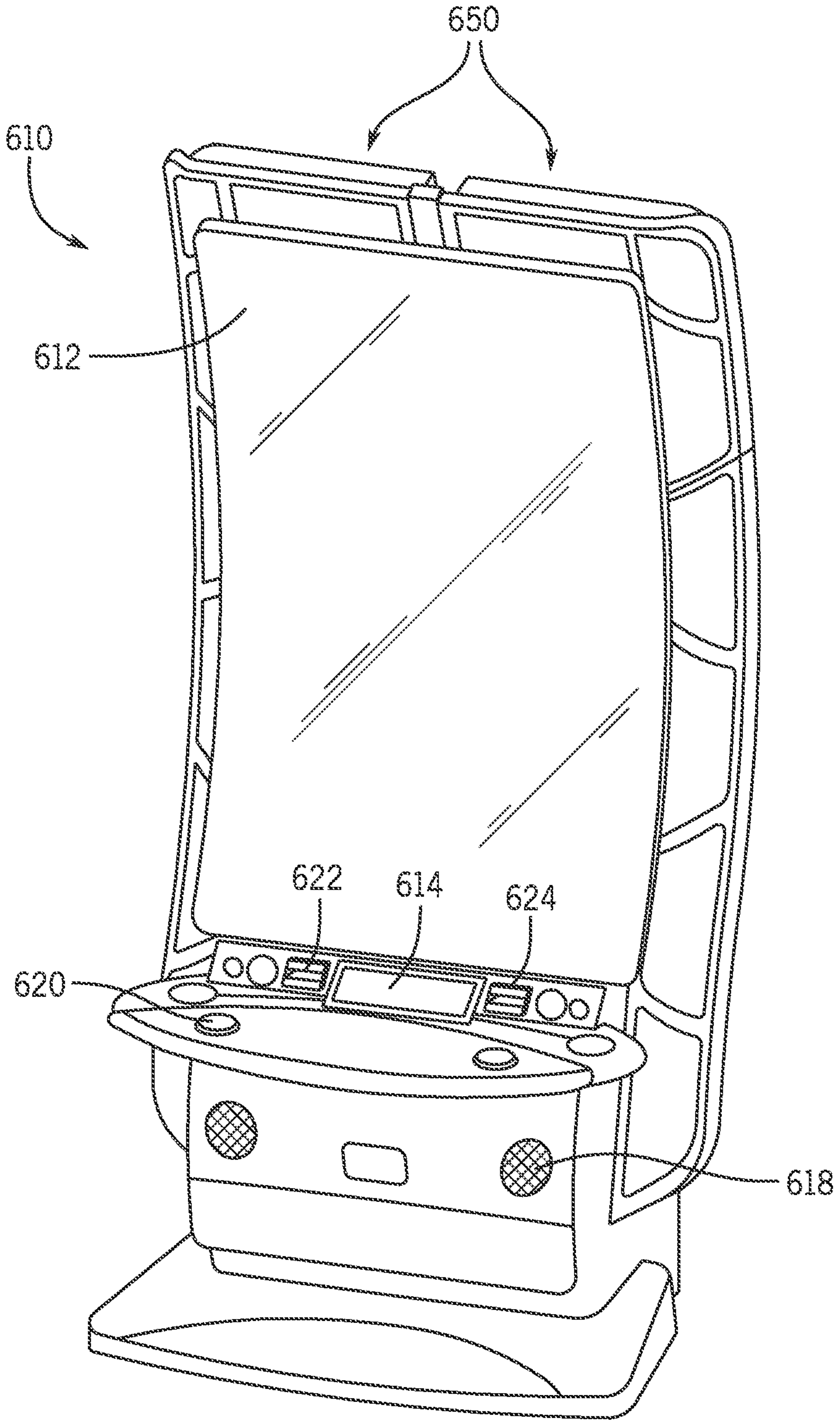
FIG. 6 is a perspective view of an embodiment of a gaming machine with an emotive lighting system.

Elements of the electronic architecture 510 may be disposed in a gaming machine (such as game machines 202). For example, the emotive lighting system may be configured to enhance a user's experience on a standalone game machine and thus be in communication with the game-logic circuitry dedicated to the particular game machine. An embodiment of a standalone gaming machine with an emotive lighting system is illustrated in FIG. 6. In another embodiment, the emotive lighting system may be configured to enhance a user's experience of a community bonus game displayed on a community display device, and may be configured as standalone "attract" lighting or disposed proximal to a display screen displaying promotional images.

Detailed Description of an Embodiment

FIG. 6 shows an embodiment of a wagering game machine 610 that is augmented with an emotive lighting system 650. The wagering game machine 610 includes many of the same functional elements as the exemplary wagering game machine 310 of FIG. 3 and may also be equivalent to the wagering game machines 202 referenced in FIG. 2. For example, wagering game machine 610 includes a primary display device 612 and a secondary display device 614, and one or more audio speakers 618. The wagering game machine 610 may further include a touch screen(s) mounted of the primary or secondary display device, buttons 620, a bill validator 622, and a ticket reader/writer 624.

The emotive lighting system 650 is disposed proximal to the primary display device 612 and is configured in two pieces—each extending from the top of the primary display device 612 and down either side. The two-piece configuration is for manufacturing and assembly convenience only and does not indicate limitations on the size, shape, or appearance of an emotive lighting system. Additionally, the emotive lighting system may be adapted to operate as a standalone "attract" light display and may be combined with other types of lighting/video/audio presentations.

Figure 7:
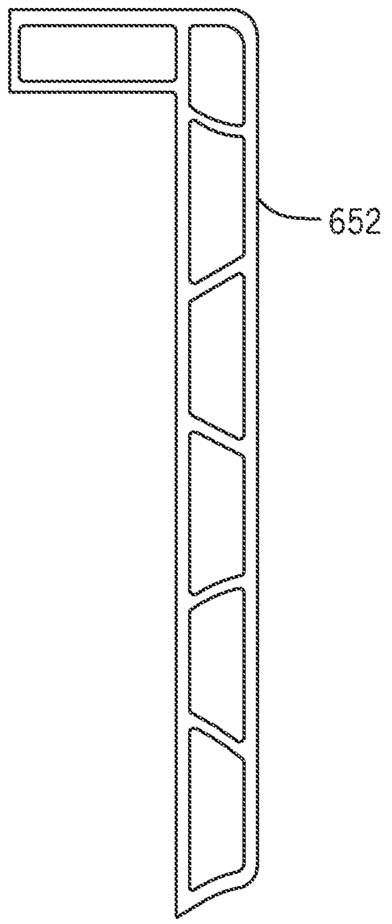
FIG. 7 is a front view of a portion of the emotive lighting system of FIG. 6.
Figure 8:
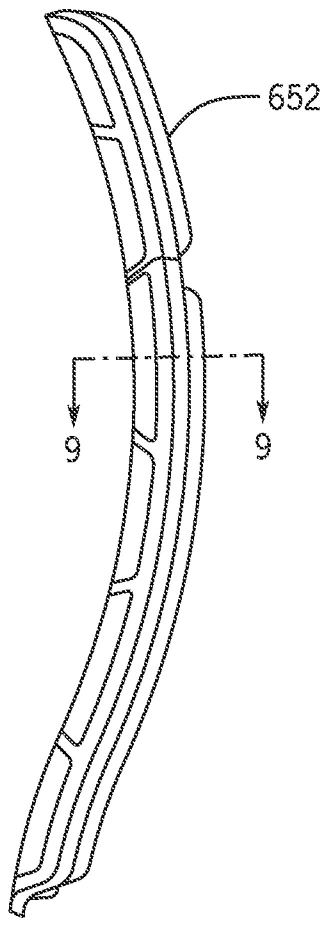
FIG. 8 is a side view of the portion of the emotive lighting system of FIG. 6.

FIG. 7 and FIG. 8 are a front view and a side view, respectively, of one piece 652 of the emotive lighting system 650. It is evident from FIGS. 7 and 8 that an emotive lighting system can be configured in both simple and complex shapes. The front view (FIG. 7) of the emotive lighting system piece 652 demonstrates that the emotive lighting system could be simply rectangular and sized to fit various conventionally shaped display screens and/or televisions. Conversely, as shown in the side view of FIG. 8, the piece 652 is actually curvilinear and matches the concave curve of the primary display device 612. The adaptability of the emotive lighting system to different shapes and configurations is only limited by materials, manufacturing and fabrication methods employed in its construction.

Figure 9:
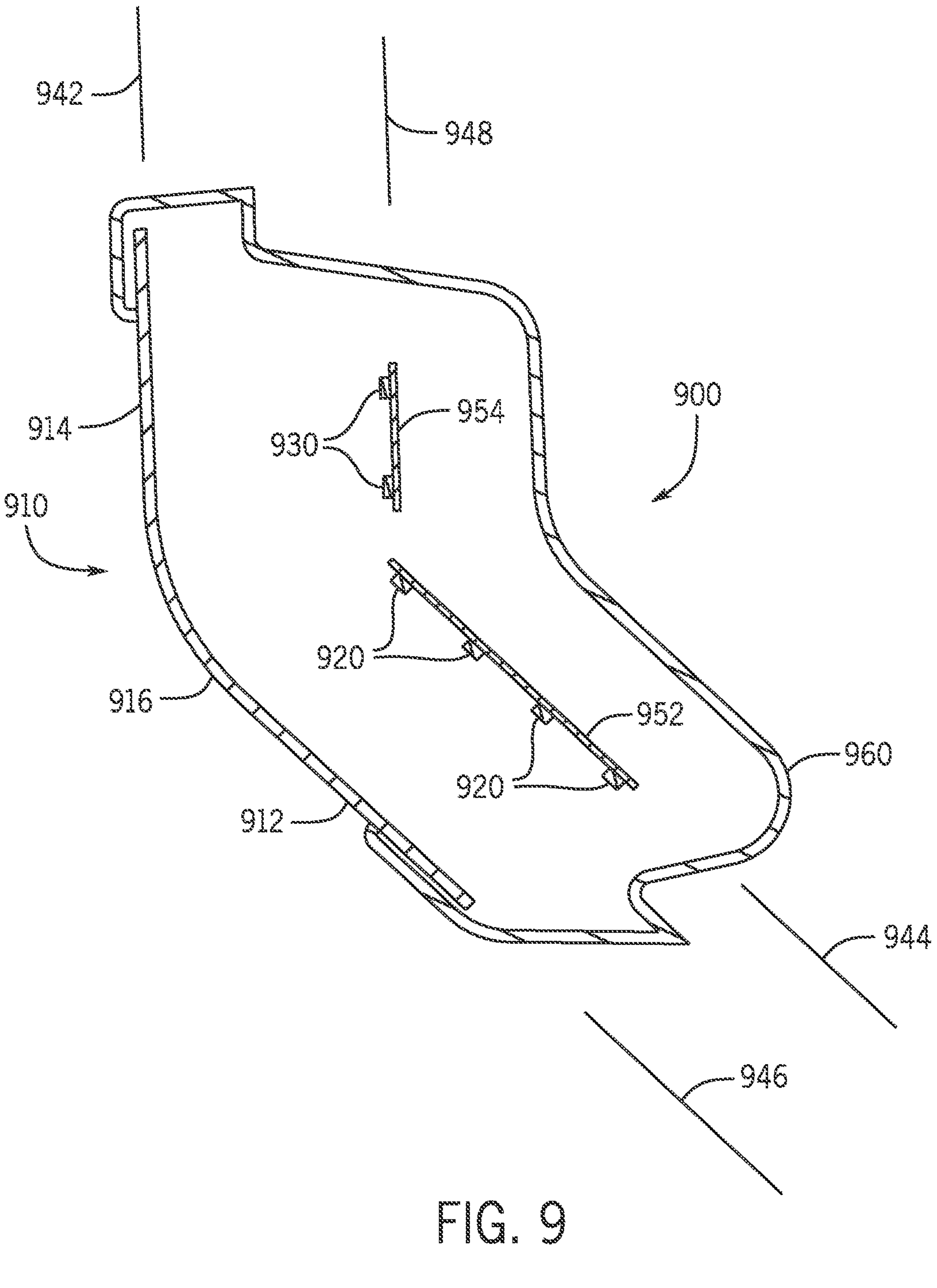
FIG. 9 is a section view across line 9-9 of FIG. 8.

The structural components of an embodiment of an emotive lighting system are illustrated in FIG. 9. FIG. 9 is a section view across line A-A of FIG. 8 and shows the relative positioning and size of some exemplary internal and external emotive lighting components.

The emotive lighting system 900 illustrated in FIG. 9 includes support structure 960 providing anchoring for the various internal and external components as well as elements to facilitate mounting the emotive light system 900.

The light system 900 employs point light sources 920, 930 disposed behind a lenticular lens assembly 910 to create volumetric lighting effects. A lenticular lens, as used herein, is a transparent or translucent manufacture having a smooth side and a side comprising a plurality of "lenticules," small lenses or prisms formed on the surface of the lens. The lenticules may be arrayed in a variety of patterns, shapes, and sizes, but one of their functions is to refract light through the lens material, causing the light to change direction upon entry into the lens and to exit the material in different directions responsive to the physical and material properties of the lenticular lens.

The lenticular lens assembly 910 may be manufactured as a unitary component, e.g., a single piece of lens material with a smooth side and a lenticule side. Alternatively, the lenticular lens assembly 910 may be fabricated by combining a rigid transparent outer portion with a thin, usually flexible, inner lenticular film.

In an embodiment, the lens assembly 910 includes a section 914 that defines a first plane 942 (extending into/out of the page) and another section 912 that defines a second plane 946 (also extending into/out of the page). As shown in FIG. 9, the planar sections 914 and 912 are joined by a curvilinear section 916, although other embodiments may opt for abutting sections or other types of joints/transitions.

Viewable through the lenticular lens assembly, for example, by a player in front of the wagering game machine 610, a first plurality of point light sources 920 is disposed on a planar board 952 that defines a third plane 944, which is non-parallel to the first plane 942. Depending on a viewing angle of a player, the first plurality of point light sources 920 may be viewable through any of the lens assembly sections 912, 914, or 916. The lighting system 900 also includes a second plurality of point light sources 930 disposed on a planar board 954 that defines a fourth plane 948, which is non-parallel to the second plane 946. Similarly, the plurality of point light sources 930 may be viewable through any of the lens assembly sections 912, 914, 916. When the plurality 920 (on the third plane) is viewed through the planar section 914 (on the first plane 942), and/or when the plurality 930 (on the fourth plane 948) is viewed through the planar section 912 (on the second plane 946), and/or when either plurality is viewed through the curvilinear section 916, the abovementioned volumetric effects cause appearance of light tendrils extending through the interior of the emotive lighting system and across the surface of the lenticular lens assembly.

The arrangement and configuration of the lenticular lens assembly 910 are provided for example only and are not considered limiting to the claimed invention. A lenticular lens for an emotive lighting system may include planar and non-planar sections, the sections may be separate and distinct from each other, may comprise planar sections that abut each other or are connected with opaque elements, may comprise only non-planar sections, and combinations thereof. Further, a lenticular lens assembly may comprise a single, unitary lens element that includes some, any, or all of the various configurations.

Other, more radical designs of an emotive lighting system are contemplated and considered to be within the scope of the invention. In an embodiment, a plurality of point light sources may be enclosed by a non-planar, curvilinear lenticular lens assembly. The curvilinear lenticular lens assembly may be regularly shaped, for example, a cylindrical or conical shape. The lens assembly may be complex curvilinear, arbitrary, or combinations thereof. The point light sources may be hidden across a range of viewing angles and only viewable across a limited range of viewing angles.

The point light sources may be arranged on one or more separate planes, as seen in the embodiment of FIG. 9. Alternatively, the point light sources may be unevenly and/or arbitrarily distributed within an enclosed volume of the emotive lighting system.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

The foregoing description, for purposes of explanation, uses specific nomenclature and formula to provide a thorough understanding of the disclosed embodiments. It should be apparent to those of skill in the art that the specific details are not required in order to practice the disclosed embodiments. The embodiments have been chosen and described to best explain the principles of the invention and its practical application, thereby enabling others of skill in the art to utilize the invention, and various embodiments with various modifications as are suited to the particular use contemplated. Thus, the foregoing disclosure is not intended to be exhaustive or to limit the invention to the precise forms disclosed, and those of skill in the art recognize that many modifications and variations are possible in view of the above teachings.

The invention claimed is:

1. A gaming system for playing a casino wagering game, the gaming system comprising:
- game-logic circuitry configured to conduct the casino wagering game;
- an emotive lighting system including:
  - a lenticular lens defining a first plane;
  - a plurality of point light sources defining a second plane, the first and second planes being non-parallel;
  - another lenticular lens defining a third plane, the plurality of point light sources being viewable through both the lenticular lens and the another lenticular lens;
  - another plurality of point light sources defining a fourth plane, the third and fourth planes being non-parallel, the another plurality of point light sources being viewable through the another lenticular lens; and
  - a curvilinear lenticular lens component connected between the lenticular lens and the another lenticular lens; and
- one or more light-controlling processors in communication with the game-logic circuitry, the one or more light controlling processors configured to operate the point light sources of the plurality responsive to communications from the game-logic circuitry, the operating including one or more of:
  - switching point light sources on and off;
  - varying colors of light produced by point light sources; or
  - modifying brightness levels of point light sources.

2. The gaming system of claim 1, wherein the another plurality of point light sources is viewable through the lenticular lens.

3. The gaming system of claim 2, wherein the plurality of point light sources and the another plurality of point light sources are viewable through the curvilinear lenticular lens component.

4. The gaming system of claim 1, wherein the communications from the game-logic circuitry include real-time information related to a state of the casino wagering game and wherein the one or more light-controlling processors adjust light characteristics of the plurality of point light sources responsive to changes in the dynamic state of the casino wagering game.

5. The gaming system of claim 1, wherein the emotive lighting system is at least partly disposed proximal an electronic display device of a wagering game machine in communication with the game-logic circuitry.

6. The gaming system of claim 1, wherein the emotive lighting system is at least partly disposed proximal to a community display device associated with a plurality of wagering game machines.

7. The gaming system of claim 1, wherein the lenticular lens comprises flexible lenticular film.

8. The gaming system of claim 1, wherein the game-logic circuitry resides on a game server on a communications network and the one or more light-controlling processors communicate with the game-logic circuitry over the communications network.

9. The gaming system of claim 8, wherein the game-logic circuitry conducts the casino wagering game on a community display device associated with a plurality of wagering game machines and the emotive lighting system is at least partly disposed proximal to the community display device.

10. An emotive lighting system comprising:
- one or more light-controlling processors in communication with game-logic circuitry configured to conduct a casino wagering game;

a lenticular lens assembly including a first lens component defining a first plane and a second lens component defining a second plane, the first plane and the second plane being non-parallel;

a first plurality of light sources defining a third plane that is non-parallel to the first plane and a second plurality of light sources defining a fourth plane that is non-parallel to the second plane, both the first plurality of point light sources and the second plurality of point light sources being viewable through both of the first lens component and the second lens component;

a curvilinear lenticular lens component connecting the first and second lens components;

the one or more light-controlling processors configured to operate the point light sources of the first and second pluralities responsive to communications from the game-logic circuitry, the operating including one or more of:

switching point light sources on and off, varying colors of light produced by point light sources, or modifying brightness levels of point light sources.

11. The emotive lighting system of claim 10, wherein both the first plurality of point light sources and the second plurality of point light sources are viewable through the curvilinear lens component.

12. The emotive lighting system of claim 10, wherein the first, second, and curvilinear lens components form a continuous lens component.

13. The emotive lighting system of claim 10, wherein the game-logic circuitry conducts the casino wagering game on a gaming machine that includes an electronic display device configured to display game images, and wherein the emotive light system is at least partially disposed proximal to the electronic display device.

14. A method of creating volumetric lighting effects with an emotive lighting system, the emotive lighting system including one or more light-controlling processors connected for communication to game-logic circuitry configured to conduct a casino wagering game, a lenticular lens defining a first plane, a plurality of point light sources defining a second plane that is non-parallel to the first plane, another lenticular lens defining a third plane, and a curvilinear lens component connected between the lenticular lens and the another lenticular lens, the plurality of point light sources being viewable through both the lenticular lens and the another lenticular lens, the method comprising:

receiving, by the one or more light-controlling processors, information about a state of the casino wagering game being conducted by the game-logic circuitry;

operating, by the one or more light-controlled processors, the plurality of point light sources responsive to the received information, the operating including one or more of:

switching point light sources on and off, varying colors of light produced by point light sources, or modifying brightness levels of point light sources.

15. The method of claim 14, wherein the operating further includes switching, varying, or modifying light characteristics in patterns travel across regions of the emotive lighting system.

16. The method of claim 14, wherein the game-logic circuitry conducts the casino wagering game on a gaming machine that includes an electronic display device configured to display game images of the casino wagering game, and wherein the emotive light system is at least partially disposed proximal to the electronic display device.

17. The method of claim 16, wherein the operating further includes switching, varying, or modifying light characteristics in synchronization with the game images displayed on the electronic display device.

18. The method of claim 14, wherein the game-logic circuitry conducts the casino wagering game on a community display device associated with a plurality of wagering game machines and the emotive lighting system is at least partly disposed proximal to the community display device.

19. A gaming machine primarily designed for playing a casino wagering game, the gaming machine comprising:

an electronic display device configured to display game images;

game-logic circuitry configured to conduct the casino wagering game and to direct the electronic display device to display the game images;

an emotive lighting system disposed at least partly proximal to the electronic display device, the emotive lighting system including:

a plurality of point light sources extending along a line, a non-planar lenticular lens enclosing the plurality of point light sources and extending along the line, the plurality of point light sources being viewable through the lenticular lens;

one or more light-controlling processors in communication with the game-logic circuitry, the one or more light-controlling processors configured to operate the point light sources of the plurality responsive to communication from the game-logic circuitry including one or more of:

switching point light sources on and off, varying colors of light produced by point light sources, or modifying brightness levels of point light sources.

20. The gaming system of claim 19, wherein the lenticular lens is substantially conical with a cone axis extending along the line.

* * * * *